(12) United States Patent
Danadach et al.

(10) Patent No.: US 12,531,160 B1
(45) Date of Patent: Jan. 20, 2026

(54) RISK ASSESSMENT FOR METABOLIC SYNDROME

(71) Applicant: Apple Inc., Cupertino, CA (US)

(72) Inventors: Sandra Hala Danadach, Palo Alto, CA (US); Xin Zhan, Sunnyvale, CA (US); Myoungil Cha, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 17/308,935

(22) Filed: May 5, 2021

Related U.S. Application Data

(60) Provisional application No. 63/026,649, filed on May 18, 2020.

(51) Int. Cl.
*A61B 5/00* (2006.01)
*A61B 5/024* (2006.01)
*G16H 50/30* (2018.01)

(52) U.S. Cl.
CPC ......... *G16H 50/30* (2018.01); *A61B 5/02405* (2013.01); *A61B 5/02416* (2013.01); *A61B 5/681* (2013.01); *A61B 5/7264* (2013.01); *A61B 5/7275* (2013.01)

(58) Field of Classification Search
None
See application file for complete search history.

(56) References Cited

U.S. PATENT DOCUMENTS

| | | | |
|---|---|---|---|
| 2013/0267791 A1 | 10/2013 | Halperin et al. | |
| 2016/0354038 A1* | 12/2016 | Demirtas | A61B 5/721 |
| 2020/0100693 A1* | 4/2020 | Velo | A61B 5/746 |
| 2020/0160998 A1 | 5/2020 | Ward et al. | |

FOREIGN PATENT DOCUMENTS

WO    2020/008192 A2    1/2020

OTHER PUBLICATIONS

Avram, Robert et al., "A digital biomarker of diabetes from smartphone-based vascular signals." Nature Medicine, Letters downloaded from https://doi.org. 10.1038/s41591-020-1010-5. Oct. 2018. 21 pages.

* cited by examiner

*Primary Examiner* — Sana Sahand
(74) *Attorney, Agent, or Firm* — Kilpatrick Townsend & Stockton LLP

(57) ABSTRACT

Aspects of the present disclosure include methods for assessing metabolic risk. In one example, a device may receive a set of heartbeats over a time interval. A set of time interval statistics for the time interval may be generated by generating values for each of a set of heartbeat data types based on a subset of the set of heartbeats and corresponding to a portion of the time interval and generating a time interval statistic based on values of a heartbeat data type. The set of time interval statistics may be processed using a machine-learning model to generate a risk score for the time interval. The device may determine that the risk score is greater than a predetermined threshold, and in response, output an indication of a health risk that is associated with a user of the device.

20 Claims, 8 Drawing Sheets

RISK ASSESSMENT FOR METABOLIC SYNDROME

CROSS-REFERENCE TO RELATED APPLICATION

This application claims priority to U.S. Provisional Application Ser. No. 63/026,649 filed May 18, 2020 entitled "Risk Assessment for Metabolic Syndrome," which is incorporated herein by reference in its entirety.

BACKGROUND

Negative health conditions are generally identified by symptoms reported by the individual experiencing the health condition. In some instances, an individual may not recognize a symptom as being a likely sign of the negative health condition and fail to report the symptom to healthcare personnel. For example, the symptom may be mild or resemble something benign like a headache. In those instances, the symptoms often go unreported, which may worse the negative health condition and an overall health outcome of the individual.

SUMMARY

Aspects of the present disclosure include a method for risk assessments for metabolic syndromes. The method comprises: for each time interval of a set of time intervals: receiving, at a device, a set of heartbeats during the time interval; generating a set of time interval statistics for the time interval by: generating values for each of a set of heartbeat data types based on a subset of the set of heartbeats and corresponding to a portion of the time interval, wherein one or more durations of the portion of the time interval used to generate values of a first heartbeat data type of the set of heartbeat data types is different than one or more durations of the portion of the time interval used to generate values of a second heartbeat data type of the set of heartbeat data types; and generating a time interval statistic based on values of a heartbeat data type; and processing the set of time interval statistics using a machine-learning model to generate a risk score for the time interval; determining that the risk score is greater than a predetermined threshold; and outputting, in response to the risk score being greater than the predetermined threshold, an indication of a health risk that is associated with a user of the device.

Another aspect of the present disclosure comprises a system comprising one or more processors and a non-transitory computer-readable media that includes instructions that when executed by the one or more processors, cause the one or more processors to perform the methods described above Another aspect of the present disclosure comprises a non-transitory computer-readable media that includes instructions that when executed by one or more processors, cause the one or more processors to perform the methods described above.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
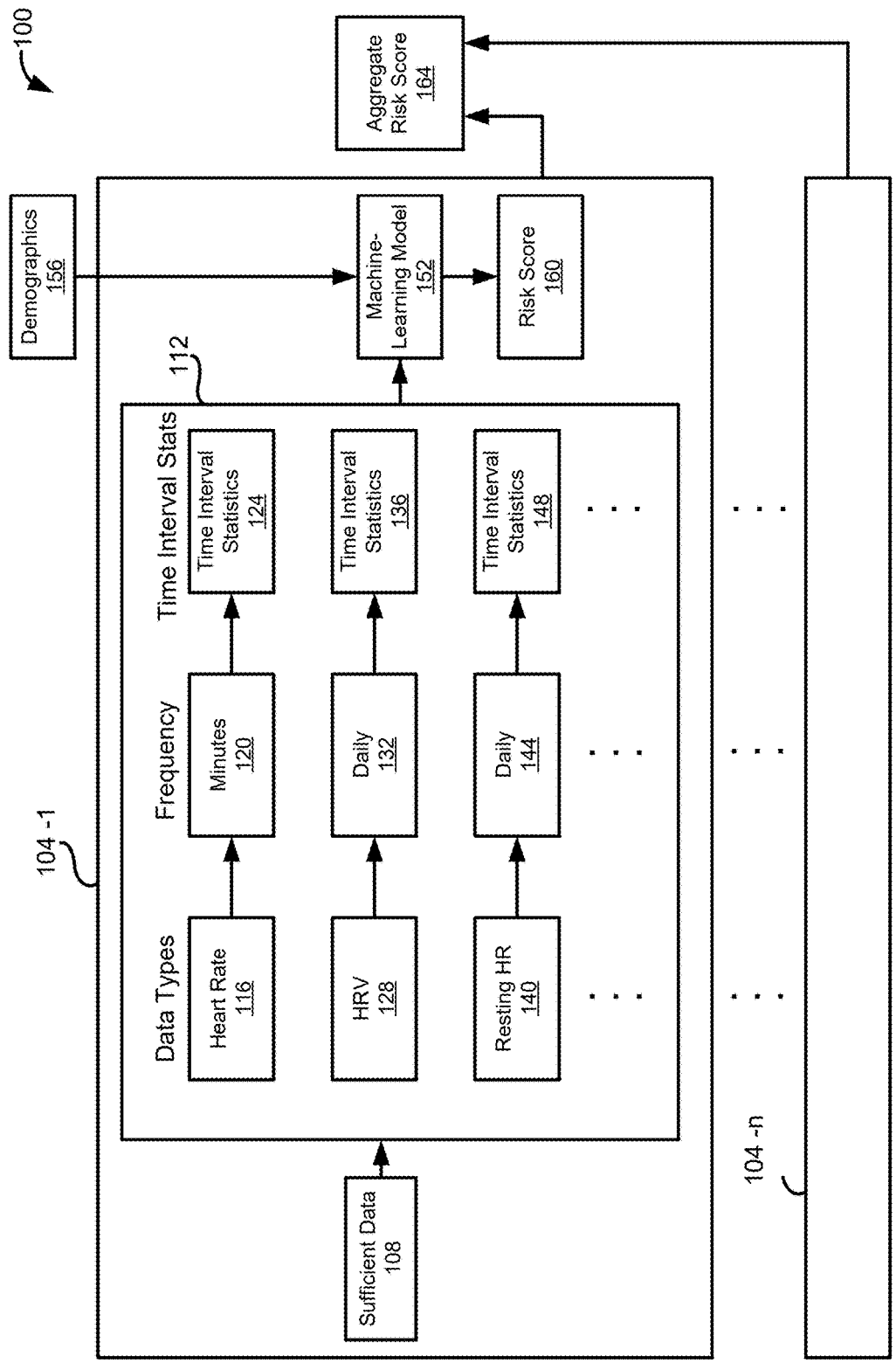
FIG. 1 illustrates an example block diagram for assessing metabolic syndrome risk according to an embodiment of the present disclosure.

The present disclosure relates to processing sensor data to predict a health-related characteristic of a person. Some or all of the sensor data may have been collected by one or more sensors of a wearable device, and the person may be a user of the wearable device. The prediction of a health-related characteristic can include (for example) a prediction as to whether the user has a particular medical condition, a predicted progression (or remission) of a particular medical condition and/or a prognosis. The medical condition may include a metabolic syndrome that may be indicative of other medical conditions such as diabetes. The sensor data can include at least heartbeat data (e.g., data derived from evaluating one or more heartbeats), and may optionally include additional data such as activity data. The prediction data may optionally include demographic information.

Heartbeat data may be collected using any suitable heart rate monitor, such as, for example, a photoplethysmography (PPG) sensor, an electrocardiography (ECG) sensor, or the like. The heartbeat data may include raw signals received from one or more sensors, features derived from the raw signals received from one or more sensors, or values resulting from processing the raw signals received from one or more sensors. The heartbeat data may be processed (e.g., by the wearable device or an external device) to derive data for one or more heartbeat data types, which in turn may be processed to calculate one or more time interval statistics that each correspond to a heartbeat data type. As used herein, the term time interval statistic may refer to a statistic derived from values of one or more heartbeat data types calculated from data collected over a predetermined time interval.

The heartbeat data types can include (for example) a heart rate, heart rate variability, resting heart rate, combinations thereof, or the like. In some instances, a heartbeat data type may include heartrate information associated with a predetermined activity level or type. For example, in instances where a wearable device is able to track a user's exercise (via user initiation and/or automatic detection) heart rate data collected during an activity may be used as a heartbeat data type. In some instances, the heartbeat data types include at least heart rate variability, and optionally one or more additional data types. In other variations, the heartbeat data types include at least resting heart rate, and optionally one or more additional data types.

The heartbeat data may be supplemented with additional data. The additional data may be received from the same source as the heartbeat data or from another source (e.g., such as a computing device, a server, a mobile device, a wearable device, a database, or the like. The additional data may include collected data (e.g., data collected or derived from sensor data) or persistent data (e.g., data that corresponds the user or a characteristic thereof that is unlikely to change or changes infrequently). Examples of persistent data include, but are not limited to, user demographics, an activity level of the user, an occupation of the user, or the like.

Each heartbeat data type may include values that are calculated or derived over a time window. In some instances, time-window durations may be different across at least two heartbeat data types. For example, a time-window duration for an average heart rate heartbeat data type may be an hour. A value for the heartbeat data type may be calculated every hour using the heartbeat data collected over the preceding hour. A time-window duration for a heart-rate variability heartbeat data type may be a day such that a value for heart-rate variability may be calculated once per day using the heartbeat data collected over the preceding day. In other instances, the time-window duration may be uniform across the heartbeat data types.

The heartbeat data may not be continuously collected for the entire time interval over which time interval statistics are calculated. For example, if the heartbeat data is received from a wearable device that the user only wears at certain times of day or only when performing certain activities, the heartbeat data may be inconsistent between days of a week and between weeks. The user may wear the wearable device on a first day while exercising, not wear the wearable device on the next day, and wear the wearable device all day on the following day. As a result, there may be some heartbeat data collected the first day, no heartbeat data collected the next day, and a large quantity of heartbeat data collected the following day. It may be desirable to ensure that a similar amount of data is available at different time points throughout the time interval.

For example, if a time interval statistic for heart rate variability is calculated over the span of a week, it may be desirable to use a single data value per day even if multiple data points are available on certain days. Accordingly, the values of the heartbeat data types may optionally be pre-processed by down-sampling the values of each heartbeat data type according to a frequency value that is associated with each heartbeat data type. The frequency value may indicate a frequency at which a value of the heartbeat data type is included in calculating a corresponding time interval statistic for the heartbeat data type. The frequency value may be used to down-sample the values of the heartbeat data type that are to be included in calculating the corresponding time interval statistic. The frequency value may be different across at least two heartbeat data types. Alternatively, the frequency value may be uniform across the heartbeat data types.

In some instances, down-sampling may only occur if the quantity of values of a heartbeat data type that are calculated is greater than a predetermined quantity of values of the heartbeat data type that is determined by the frequency value, user input, or the like. Returning to the previous example, if the frequency value indicates that one heart rate variability value is to be calculated per day and multiple heartbeat variability values are calculated in a day, then the multiple heart rate variability values may be down-sampled to a single value by, for example, discarding one or more values until one remains, calculating an average, calculating median, calculating a mode, or the like. Down-sampling may not occur when the quantity of values for a heartbeat data type that are calculated is less than or equal to the predetermined quantity of values for the heartbeat data type as determined by the frequency value corresponding to the heartbeat data type.

Values of a heartbeat data type may be down-sampled multiple times over the time interval over which time interval statistics are calculated. For example, the frequency value may indicate that a predetermined quantity of values are to be collected for a heartbeat data type over a time interval. Down-sampling may be used to derive additional values for the heartbeat data type that characterize that correspond to a longer time-interval duration. For example, the frequency value for the heartrate heartbeat data type may indicate that a heartrate value is to be calculated each minute. If more heartrate values are calculated in a sixty second time interval, then those values may be down-sampled to a single value, as previously described. An additional value for heartrate may be derived from the down-sampled heartrate values calculated over a larger time interval (e.g., such as a half-hour, an hour, six hours, etc.) by down-sampling the values over the larger time interval to a single value. A second frequency value may optionally be associated with each heartbeat data type that may be used to determine the larger time interval for which a second down-sampled value for the heartbeat data type may be derived.

A time-interval duration over which time interval statistics are calculated may vary across the time interval statistics. Pre-processing may be performed to aggregate subsets of values of heartbeat data types for time interval statistics with higher sampling rates to normalize a quantity of values of each heartbeat data type passed as input into a machine-learning model. For example, if a first time interval statistic includes values of a heartbeat data type calculated every three hours over a week and a second time interval statistic includes values of a heartbeat data type calculated every hour over the week, then when passed into the machine-learning model, the second time interval statistic may include three times as many values. The pre-processing normalizes the quantity of data included in each time interval statistic by, for example, calculating a mean, a median, a mode, a standard deviation, decile, combinations thereof, or the like. After pre-processing, each time interval statistic may include one or more values that represent all of the values of the heartbeat data type calculated over the time interval, and where each time interval statistic includes a same quantity of values.

For example, values for heart rate may be calculated (or down-sampled to) once per minute for a week, which may include up to 10,080 heartrate values over the week (e.g., if the sensor is worn continuously over the week). Values for heartrate variability may be calculated (or down-sampled to) once per day for a week, which may include 8 heartbeat variability values. The time-interval statistics may be pre-processed, by down-sampling or the like, such to normalize the quantity of heartrate variability values relative to the quantity of heartrate variability values. After pre-processing, the time interval statistic for heartrate may include a same quantity of values as the time interval statistic for heartrate variability.

In some instances, the machine-learning model may be configured to receive a larger quantity of values for time interval statistics having a larger quantity of values relative to a quantity of values of other time interval statistic. The time interval statistics may not need to be pre-processed because the machine-model may compensate for the variability in quantities of values. In this instance, some or all of the values of the heartbeat data types may be passed as input into the machine-learning model.

The time interval statistics can be fed to a machine-learning model, which can generate a risk score predictive of a health-related characteristic. The machine-learning model may further process (with the time interval statistics) one or more other data types. The one or more other data types can include (for example) demographic information about a user, movement data (e.g., aggregated step counts, aggregated acceleration data, etc.), and/or data collected from other biometric sensors. The one or more other data types may be pre-processed according to a frequency value to down-sample the values calculated for the one or more other data types in a similar manner as described above.

The risk score may be repeatedly calculated across multiple time periods (e.g., every day or every week). A set of risk scores may then be collectively analyzed to generate an aggregate risk score (e.g., corresponding to a two-week or one-month period). The aggregate risk score may be, for example, a mean, median or mode (or other statistic) of multiple risk scores. In some instances, another machine-learning model of a same or different type as the first machine-learning model is used to generate the aggregate risk score using multiple risk scores. The aggregate risk score may be stored in association with a time.

The aggregated risk score may be output via user interface and/or through an alert condition (such as notification to a user or to medical personnel). For instance, a user may request a current aggregated risk score or one or more historical aggregated risk scores for display the graphical user interface. In some instances, an alert condition may be evaluated using the aggregate risk score. The alert condition may be configured to be satisfied when the aggregate risk score is above a predetermined threshold. The predetermined threshold may have been determined based on a previous aggregate risk score determined for a same user. If it is determined that the condition is satisfied, a user device (e.g., the wearable device or a device paired to the wearable device) can present an alert, and/or the user device can transmit a communication to another device (e.g., associated with a medical-care entity). The alert may include one or more the aggregate risk scores, one or more underlying risk scores and/or one or more time interval statistics. The alert may recommend that the user consult or contact a medical professional (e.g., doctor).

FIG. 1 illustrates an example block diagram of a system for assessing metabolic syndrome risk according to at least one aspect of the present disclosure. System 100 may include one or more processing stages 104-1 through 104-n that generate risk scores that predict a health-related characteristic (e.g., such as a metabolic syndrome etc.) of a user. Processing stage 104-1 may receive sensor data from one or more sensors worn by the user. In one example, the one or more sensors may be included in a wearable device such as smartwatch. In another example, the one or more sensors may be positioned on the user and transmit heartbeat data to a wearable device and/or another device such as computing device or mobile device. In still yet another example, one or more sensors may be included in the wearable device worn by the user and another one or more sensors may be positioned on the user and transmit heartbeat data to a wearable device and/or another device. Examples of the one or more sensors include, but are not limited to, a photoplethysmography (PPG) sensor, electrocardiography (ECG) sensor, or the like. In some instances, processing stage 104-1 may receive sensor data from one or more other devices in addition to or in place of the wearable device. The one or more other devices may include, but are not limited to, a mobile device (e.g., such as a smartphone or the like), a pedometer, an accelerometer, or the like.

In some instances, processing stage 104-1 may be executed by a same device that collects data from the sensors. For example, if the sensor data is collected by a wearable device, then processing stage 104-1 may execute on the wearable device. In other instances, processing stage 104-1 may execute on separate device (e.g., such as a mobile device, computing device, server, etc.) from the device that collected the sensor data. In those instances, the sensor data may be collected and transmitted to the other device for processing by processing stage 104-1.

In still yet other instances, processing stage 104-1 may be executed in a distributed environment such that some operations of processing stage 104-1 may execute on a first device and other operations of processing stage 104-1 may execute on other devices. For example, a first device may execute operations of processing stage 104-1 to derive a time interval statistic for each of one or more heartbeat data types. Another device may execute operations of processing stage 104-1 to derive a time interval statistic for each of one or more other heartbeat data types. Another device may execute operations of processing stage 104-1 to processes the time interval statistics using a machine-learning model, and so on. If executing in a distributed environment, the collected heartbeat data, calculated values of heartbeat data types, time interval statistics, and/or demographic data may be shared by the each instance of processing stage 104-1 to enable operations by each instance. Each operation of processing stage 104-1 may be executed by a same device or a different device. Other processing stages 104-2 (not shown) through 104-n may execute on a same device (or devices) that executes processing stage 104-1 or on one or more different devices than the device (or devices) that executes processing stage 104-1.

Figure 2B:
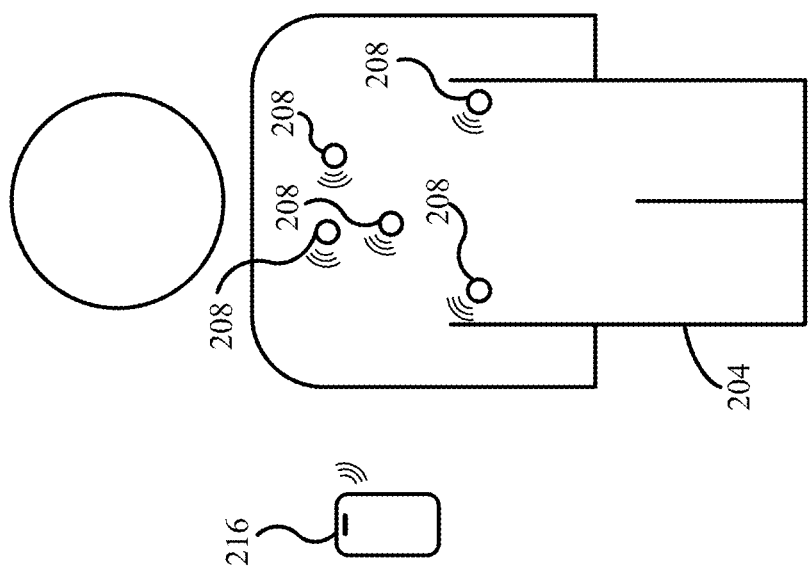
FIGS. 2A-2D illustrate examples in which data can be captured from sensors and used to asses metabolic syndrome risk according to an embodiment of the present disclosure.
Figure 2A:
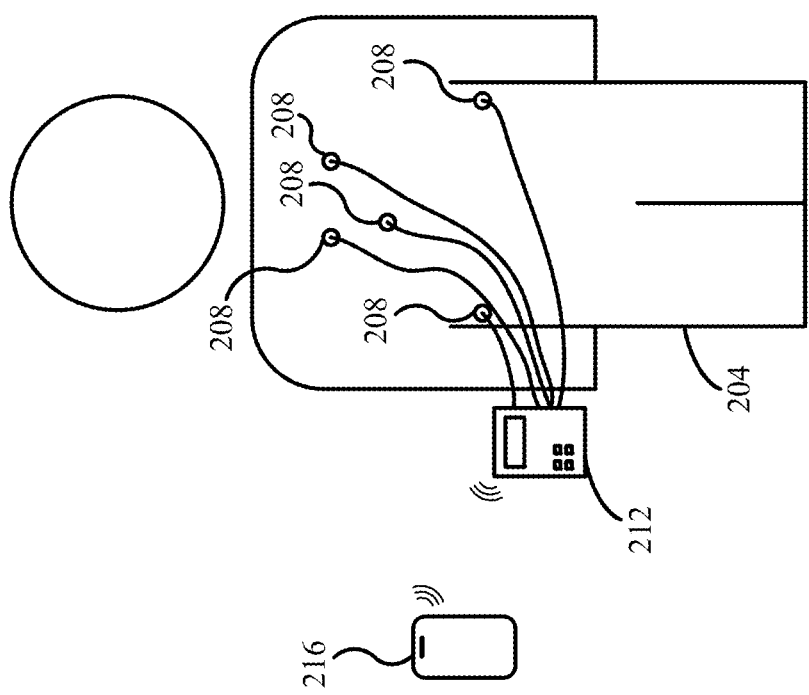

Turning to FIG. 2A-2D illustrating devices for collecting and processing sensor data to determine risk according to aspects of the present disclosure. FIG. 2A illustrates an example in which heartbeat data is gathered using one or more wired ECG sensors. User 204 (or medical personnel) may position one or more ECG sensors 208 around the upper torso and/or back of the user to capture heartbeat data of the user. ECG sensors 208 may be connected via one or more wires to control device 212. Control device 212 may aggregate sensor data collected form ECG sensors 208. In some instances, control device 212 may optionally perform some pre-processing or calculations such as, but not limited to down-sampling, normalizing, calculating values for one or more heartbeat data types from the heartbeat data, calculate values for other data types such activity data, or the like. Control data may transmit some or all of the sensor data, pre-processed data, and/or values of heartbeat data types to mobile device 216 and/or another device (e.g., such as a computing device, display device, server, database, or the like). Mobile device 216 and/or the device may execute processing stage 104-1 using the received heartbeat data, pre-processed data, and/or values of heartbeat data types. In other instances, control device may execute processing stage 104-1. In those instances, control device 212 may output the derived risk score (e.g., using a display of control device 212), transmit the risk score to mobile device 216, and/or transmit the risk score to the another device, combinations thereof, or the like).

FIG. 2B illustrates an example in which heartbeat data is gathered using one or more wireless ECG sensors. In this example, ECG sensors 212 may wireless transmit heartbeat data to a nearby device (e.g., using Bluetooth, Wi-Fi, nearfield communications (NFC), or the like). ECG sensors 212 may transmit heartbeat data to mobile device 216, which may perform some or all of the operations control device 212 and/or processing stage 104-1. In some instances, mobile device 216 may transmit collected heartbeat data, pre-processed data, values of heartbeat data types, or the like to another device such as, but not limited to, a display device, a computing device, a server, a database, or the like.

Figure 2D:
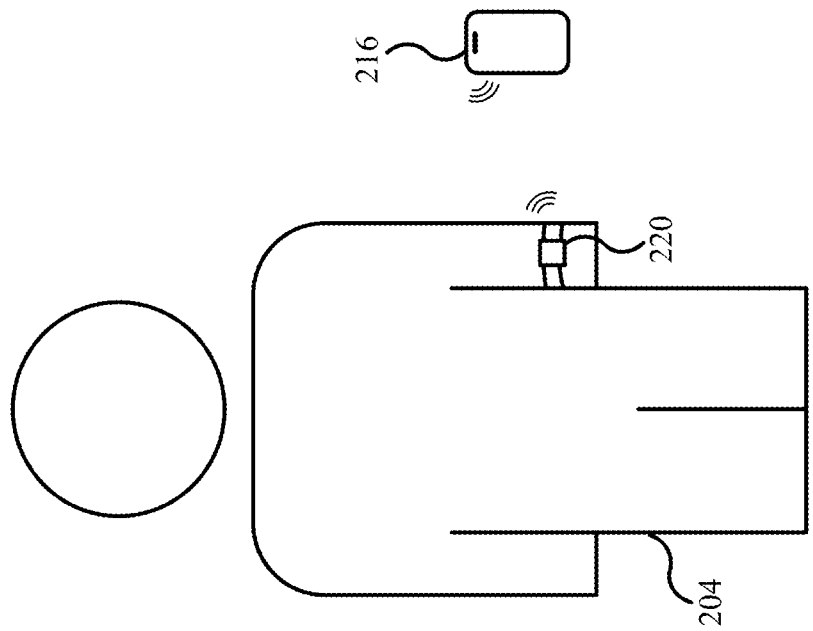
Figure 2C:
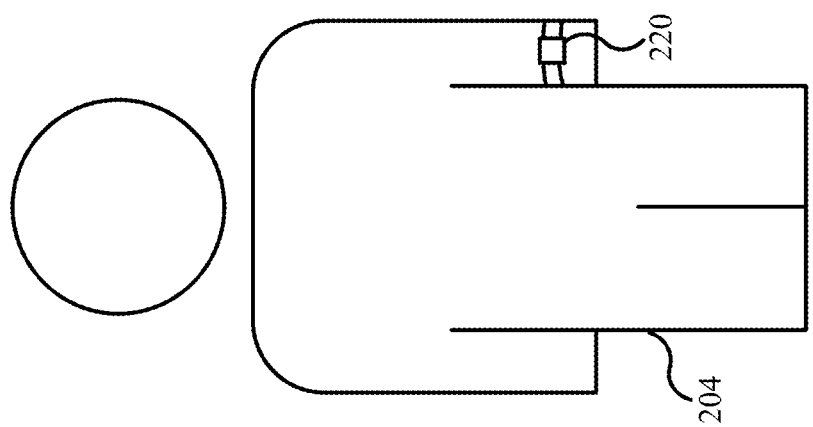

FIG. 2C illustrates an example in which heartbeat data is gathered using a wearable device 220. Wearable device 2020 may be worn on a wrist of user 204. Wearable device 2020 may be a smartwatch, a processing device, or more sensors, or the like. Wearable device 2020 may include one or more sensors (e.g., PPG sensors) for collecting heartbeat data from user. Wearable device may aggregate the heartbeat data and execute a processing stage 104-1 to generate a risk score and/or aggregate risk score as described in connection to FIG. 1. The risk score and/or aggregate risk score may be displayed to user 204 through a display of wearable device and/or transmitted to another device (e.g., a display device, a computing device, a server, a database, or the like).

FIG. 2D illustrates an example in which heartbeat data is gathered using a wearable device 220. In this example, heartbeat data may be collected by one or more sensors (e.g., PPG sensors) of wearable device. Wearable device may optionally processes the heartbeat data (e.g., pre-processing heartbeat data, calculating values for one or more heartbeat data types, executing processing stage 104-1, combinations thereof, or the like. Wearable device 220 may transmit the heartbeat data, pre-processed data, values of heartbeat data types, risk scores, and/or aggregate risk scores to a mobile device (e.g., using Bluetooth, Wi-Fi, nearfield communications (NFC), or the like) and/or another device (e.g., a display device, a computing device, a server, a database, or the like). Mobile device 216 may perform any remaining operations of processing stage 104-1 to generate a risk score or aggregate risk score using the data received from wearable device 220.

In another example, mobile device 216 may include sensors that capture heartbeat data and/or other data. Mobile device 216 may transmit the sensor data to wearable device 220 for processing by wearable device 220 (e.g., by executing processing stage 104-1). Mobile device may also optionally process some or all of the sensor data by, for example, pre-processing the sensor data, calculating heartbeat data types, executing processing stage 104-1 to derive a risk score or aggregate risk score, combinations thereof or the like. Mobile device 216 may transmit heartbeat data, pre-processed data, values of heartbeat data types, risk scores, and/or aggregate risk scores to wearable device 220 (e.g., using Bluetooth, Wi-Fi, nearfield communications (NFC), or the like) and/or another device (e.g., a display device, a computing device, a server, a database, or the like).

Returning to FIG. 1, collected sensor data may include heartbeat data collected over a predetermined time interval (e.g., a day, a week, or the like) from which values of each of one or more heartbeat data types may be derived. Each heartbeat data type may correspond to or be associated with, a heart rate, a heart rate variability, a resting heart rate, combinations thereof, or the like. A physical activity level (e.g., exercise as indicative from heartbeat data or a pedometer) may also be derived from the sensor data. The physical activity level may correspond to another data type (processed in a same manner as other heartbeat data types).

At block 108, processing stage 104-1 may determine if a sufficient quantity of sensor data has been received. This determination may be used to help ensure that there is sufficient data to adequately calculate a risk score (e.g., to avoid instances where there may not be sufficient data to derive the one or more time interval statistics). Determining whether a sufficient quantity of sensor data has been received may be based on heartbeat data types and/or time interval statistics. For instance, if the time interval of the time interval statistic is a day, a single heart rate value may not provide usable data for a machine-learning model to determine a risk score. In some instances, determining whether a sufficient quantity of sensors data has been received may be based on a duration of time in which the wearable device has been worn by a user. The duration of time over which the wearable device has been worn may provide an indication as to the quantity of heartbeat data received and how diverse (e.g., over how many unique time intervals).

In some instances, processing stage 104-1 may determine that a sufficient quantity of data corresponds to a threshold amount of sensor data sufficient to derive a predetermined quantity of values of a heartbeat data type over the predetermined time interval. For example, the predetermined quantity of values may correspond to the quantity of values used to derive a corresponding time interval statistic. Each heartbeat data type may have a different predetermined quantity of values and/or a different predetermined time interval. The predetermined quantity of values for each heartbeat data type may be based on a frequency value associated with the heartbeat data type. The frequency value may indicate a frequency (e.g., every minute, hour, day, etc.) with which values of the heartbeat data type are to be aggregated to derive a time interval statistic. In some instances, the frequency value may indicate a minimum number of values that are to be used to derive a time interval statistic.

For example, processing stage 104-1 may receive heartbeat data over regulate intervals over an entire day. The frequency value of a heartrate heartbeat data type may indicate that a heartrate value is to be calculated from the frequency value every minute for an hour. If the heartbeat data includes enough data for processing stage 104-1 to calculate 60 heartrate values over an hour, then sufficient data 108 may indicate there is sufficient data to continue processing a heartrate heartbeat data type. If heartbeat data does not include enough data to derive for processing stage 104-1 to calculate 60 heart are values over an hour, then sufficient data 108 may indicate that there insufficient data to processed to block 112.

The amount of sensor data considered to be sufficient data may vary by from one time interval statistic to another. For instance, for heart rate variability, processing stage 104-1 may generate one or more values per day, which may be derived from a smaller quantity of sensor data than the heart rate. Processing stage 104-1 may determine that there is sufficient data for a first time interval statistic but not a second time interval statistic. In those instances, processing stage 104—may continue processing sensor data to derive the first time interval statistic. For instance, if there is sufficient data to derive a time interval statistic that corresponds to a heartbeat data type of heart rate variability and another that corresponds to a heartbeat data type of resting heart rate, then processing stage 104—may continue processing even though there may be insufficient sensor data for other time interval statistics (e.g., such those that correspond to a heart rate).

In some instances, if sufficient data 108 determines that there is insufficient data to calculate time interval statistics for one or more heartbeat data types, then processing of the heartbeat data by processing stage 104-1 may terminate (e.g., a score may not be generated using the collected heartbeat data). In other instances, if sufficient data 108 determines there is insufficient data to calculate time interval statistics for one or more heartbeat data types, processing stage 104-1 may continue processing the heartbeat data to generate a risk score. The risk score may be associated with a confidence value that indicates a probability associated with the accuracy of the risk score as a result of processing stage 104-1 not having a sufficient data to generate a risk score. In still yet other instances, if sufficient data 108 determines there is insufficient data to calculate time interval statistics for one or more heartbeat data types, processing stage 104-1 may access historical heartbeat data that may be combined with the current heartbeat data to enable processing stage 104-1 to generate a risk score.

At block 112, the sensor data may be used to calculate values for each of one or more heartbeat data types. Heart rate 116 refers to quantity of heartbeats detected over a time interval, heart rate variability 128 refers to a variation in the time interval between heartbeats, and resting heart rate refers to a heart rate collected during a period of rest. Each heartbeat data type may be associated with a frequency value (e.g., frequency values 120, 132, and 144) that indicates a frequency with which values of the heartbeat data type are to be included in calculating the time interval statistic. In some instances, the frequency value may indicate a minimum number of values that are to be used to derive a corresponding time interval statistic. For example, frequency value 120 indicates that one value of a heartbeat data type (e.g., heart rate 116) calculated each minute over the time interval of the corresponding time interval statistic is to be used in deriving the time interval statistic.

In some instances, because heartbeat data may not be continuously collected for the entire time interval over which time interval statistics are calculated, it may be desirable to ensure that a similar amount of data is available at different time points throughout the time interval. For instance, the frequency in which processing stage 104-1 calculates values may cause a large quantity of values to be calculated when a large quantity of sensor data is available and a smaller quantity of values to be calculated when there is less sensor data (e.g., the wearable device was not worn or only worn periodically throughout the day). Processing stage 104-1 may pre-process the values of the heartbeat date types using the frequency value. Pre-processing may include down-sampling values of a heartbeat data type if values of the heartbeat data type are calculated at a higher rate than the frequency value.

For instance, processing stage 104-1 aggregates, based on the frequency value 120 associated with a heartbeat data type (e.g., heart rate 116), one value per minute value over the time interval of time interval statistic 124. Based on the sampling rate of the sensors, processing stage 104-1 may calculate two or more values for the heartbeat data type. The two or more values of the heartbeat data type calculated over a time interval defined by the frequency value (e.g., one minute) may be pre-processed to derive a single value by, for example, discarding one or more values until one remains, calculating an average, calculating median, calculating mode, or the like.

Processing stage 104-1 may derive time interval statistics by normalizing an aggregated set of values of each heartbeat data type. Since processing stage 104-1 calculates more values of a first heartbeat data type (e.g. heart rate 116) than values of other heartbeat data types (e.g., heart rate variability 128), the first heartbeat data type may skew further processing of the heartbeat data types. For example, a heartbeat data type (e.g., heart rate) may include significantly more values (e.g., one value per every minute) than another heartbeat data type such as heart rate variability (e.g., one value per day). The mismatch in the quantity of values may cause subsequent processing of the values by a machine-learning model to weight the importance of heart rate values over heart rate variability despite heart rate variability being of greater importance in predicting a risk scores (such as a metabolic syndrome risk or other health related characteristic of a person) in many instances. To prevent the larger quantity of values of one datatype from skewing operation of the machine-learning, a time interval statistic may be derived for each heartbeat data type (e.g., time interval statistics 124, 136, and/or 148).

Each heartbeat statistic may include one or more values that each represent a characteristic of a corresponding heartbeat data type. The one or more values may include, but are not limited to, an average of the values of the heartbeat data type, a standard deviation of the values of the heartbeat data type, a decile, one or more normalized values (e.g., relative to another heartbeat data type), one or more weighted values of the values of the corresponding heartbeat data type, combinations thereof, or the like. Processing stage 104-1 may generate time interval statistic 124 for the values of the heartbeat data type that corresponds to heart rate 116, time interval statistic 136 for the values of the heartbeat data type that corresponds to heart rate variability 128, and time interval statistic 148 for the values of the heartbeat data type that corresponds to resting heart rate 140.

Figure 3:
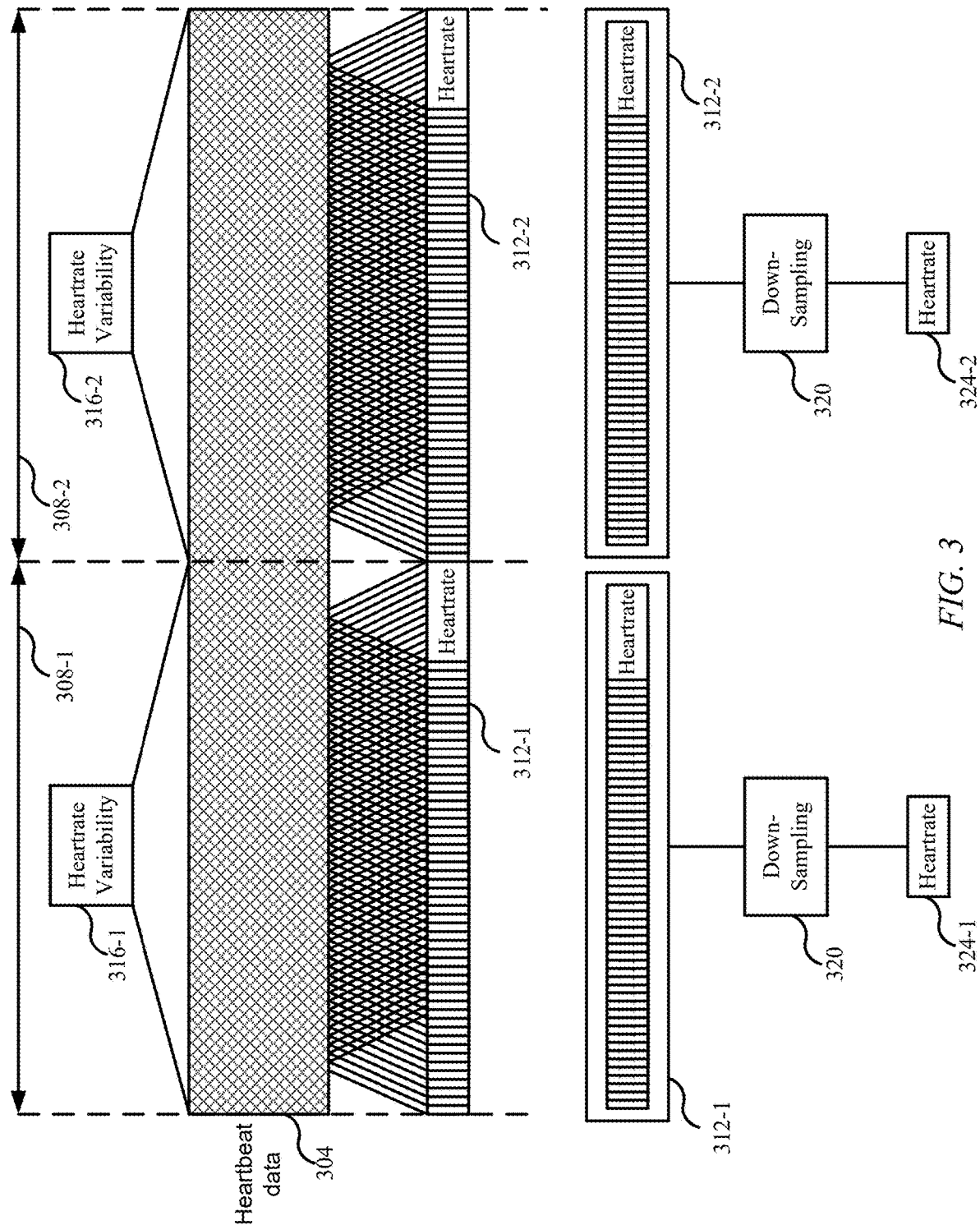
FIG. 3 depicts an example block diagram illustrating down-sampling values of heartrate data types according to aspects of the present disclosure.

For example, FIG. 3, depicts an example block diagram illustrating down-sampling values of heartrate data types according to aspects of the present disclosure. Heartbeat data 304 may be collected over a time interval. Values for one or more heartbeat data types may be calculated from the heartbeat data within discrete sub time intervals 308-1 and 308-2 within the time interval. The sub time interval 308 may be any time interval that is less than or equal to the time interval over which heartbeat data may be collected. As shown, the sub time interval may be a day. Each heartbeat data type may be calculated at different frequencies. For example, heartrate values 312-1 may be calculated at a high frequency (e.g., once value per minute) causing many heartrate values 312-1 to be calculated over sub time interval 308-1. Heartrate variability 316-1 may be calculated at a low frequency (e.g., once per day) causing a single value for heartrate variability 316-1 to be calculated in sub time interval 308-1.

If the values for each heartbeat data type are not down-sampled, then the one heartrate variability value may be processed with up to 1440 heartrate values (e.g., calculated once per minute over the day) collected over the same time interval. This may cause the machine-learning model to weight heartrate values differently due to the quantity of the values relative to the heartrate variability values, which may reduce the accuracy of prediction generated by the machine-learning model.

Processing stage 104-1 may aggregate the values of a heartbeat data type and down-sample the values to a predetermined quantity of values. In some instances, the predetermined quantity of values may be equal to the quantity of values of the heartbeat data type that is calculated at the lowest frequency. For example, as shown. heartrate variability may be calculated once per day, which is calculated at a lower frequency than heartrate values. As a result, heartrate values may be down-sampled to equal the quantity of values calculated for heartrate variability, which is one value per day. As shown, heartrate values 312-1 may be downsampled 320 to generate a single heartrate value 324-1 that may be representative of the heartrate values collected over sub time interval 312-1. The single heartrate value 324-1 may be derived by, for example, discarding one or more values until one remains, calculating an average, calculating median, calculating mode, a decile, or the like.

During the subsequent sub-time interval 308-2, another set of heartrate values 312-2 may be calculated and another heartrate variability value 316-2 may be calculated. Processing stage may down-sample 320 the heartrate values calculated over the subsequent sub-time interval 308-2 to derive another heartrate value 324-2 that is representative of heartrate values 312-2. This process may continue for each sub time interval of the time interval.

Returning to FIG. 1, machine-learning model 152 may be executed using time interval statistics such as time interval statistics 124, 136, and 148. Processing stage 104-1 may also use other time interval statistics such as those that correspond to an activity level, a diet, or the like. In some instance, machine-learning model 152 may also use demographic data 156 associated the user of the wearable device. Machine-learning model 152 may generate an output risk score that is indicative of a health characteristic of a person (e.g., such as a metabolic syndrome). The machine-learning model may be any type of machine-learning model such as, but not limited to a decision tree (e.g., such as a heuristic tree, a boosting tree, or the like), a neural network (e.g., such as a recurrent neural network, deep neural network, convolution neural network, or the like), or the like.

The risk score generated by process stage 104-1 may be aggregated with risk scores generated by other processing stages 104-n to form aggregated risk score 164. Processing stage 104-1 may generate a first risk score based on sensor data collected over a first predetermined time interval. Another processing stage 104-n may generate a second risk score based on sensor data collected over a second predetermined time interval. For instance, the first predetermined time interval may be a first week and the second predetermined time interval may be a second week that begins upon termination of the first week.

Figure 4:
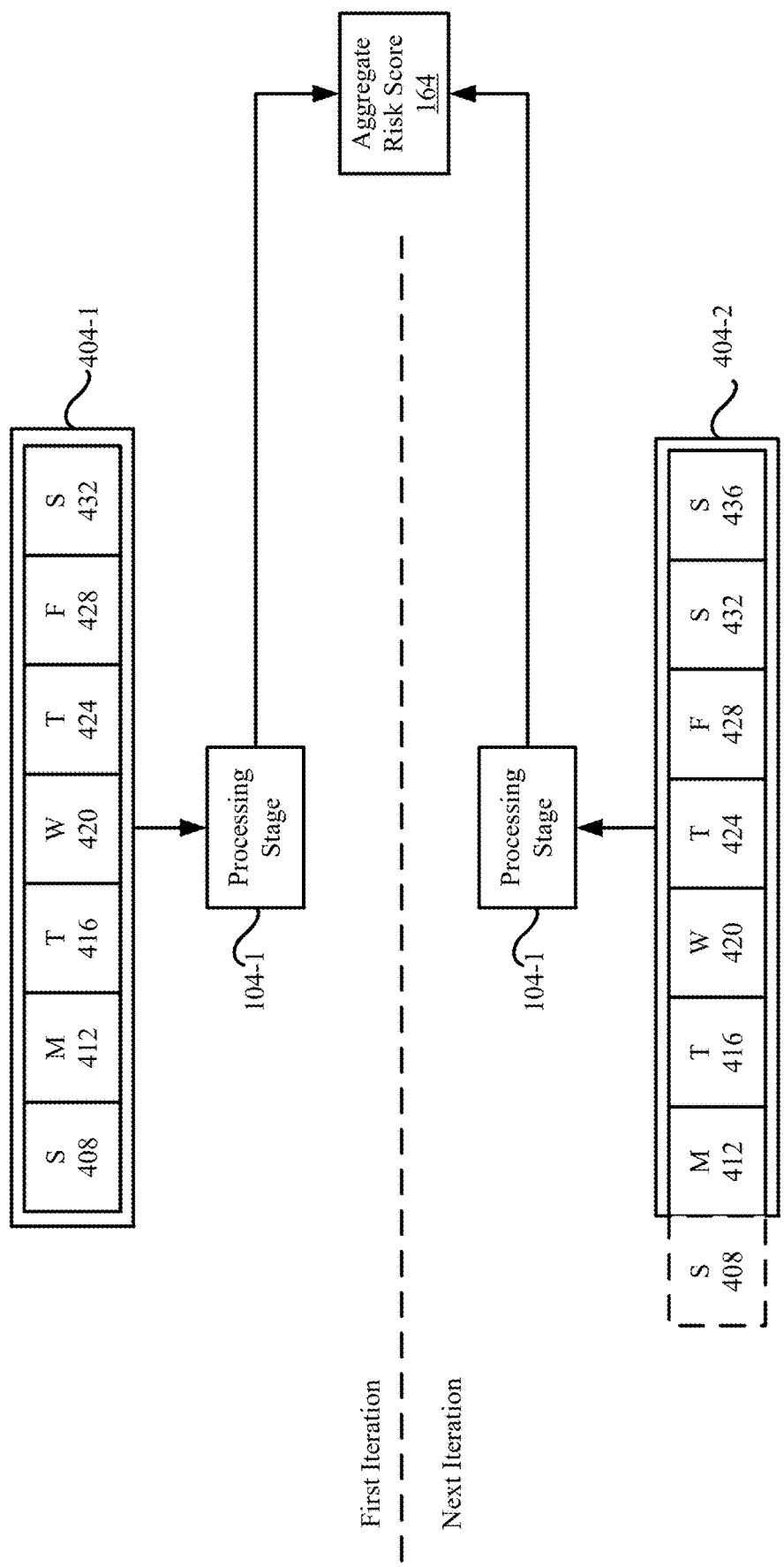
FIG. 4 depicts an example block diagram for processing overlapping heartbeat data according to aspects of the present disclosure.

Alternatively, the processing stages may operate as a sliding window wherein a portion of each subsequent predetermined time interval may overlap with a previous predetermined time interval as shown to FIG. 4. FIG. 4 depicts an example block diagram for processing overlapping heartbeat data according to aspects of the present disclosure. Processing stage 104-1 may receive heartbeat data collected over a sliding window of a predetermined length. For example, during a first iteration, heartbeat data 404-1 may be received over a sliding window that corresponds to a week. The heartbeat data 404-1 may include heartbeat data collected in contiguous days of the week such as each of Sunday 408, Monday 412, Tuesday 420, Thursday 424, Friday 429, and Saturday 432. Heartbeat data 404-1 may be passed to processing stage 104-1, which may process the heartbeat data to derive a risk score. The risk score may be passed to aggregate risk score 164. Since this is the first iteration, there may not other risk scores that can be aggregated with this risk score. The aggregate risk score may be equal to the risk score output from processing stage 104-1.

The process may wait for a time interval over which the sliding window may iterate. Each iteration can create a new time window for the purposes of making a calculation. Heartbeat data associated with a time stamp within the time window can then be aggregated and process to determine a risk score for the window. For example, as shown in FIG. 4, the sliding window may iterate each day, such that Sunday 408-Saturday 432 constitutes a first window used to generate a first risk score, and Monday 412-Sunday 436 constitutes a second window used to generate a second risk score. This may cause the earliest 24 hours of heartbeat data (e.g., Sunday 408) to be removed from the sliding window and heartbeat data collected over the previous 24 hours (e.g., Sunday 436) to be added to the sliding window. Heartbeat data 404-2 identified by the sliding window may be passed to processing stage 104-1, which may generate a new risk score using the new heartbeat data 404-2 identified by the sliding window. The risk score may be output to aggregate risk score 164. Aggregate risk score may aggregate the new risk score form the next iteration with the risk score from the first iteration to generate an aggregate risk score.

The process may continue by processing a subsequent iteration of the sliding window (e.g., 24 hours after the next iteration). The sliding window of this iteration may exclude Monday 412 and include new heartbeat data collected over the Monday (not shown) after Sunday 436. This process may continue indefinitely or until the aggregate risk score is greater than a threshold, upon receiving user input, or the like.

Aggregating the risk scores generated from each processing stage may include executing a machine-learning model (e.g., machine-learning model 156 or a different machine-learning model) using the generated risk scores to generate an aggregated risk score.

Alternatively, the aggregate risk score may be calculated (e.g., by averaging the generated risk scores or the like). In some instance, once two risk scores are generated an aggregated risk score may be generated. A subsequent processing stage may execute to generate a third risk score. The third risk score may be aggregated with the aggregated risk score to generate an updated aggregated risk score. This may include passing the aggregated risk score and the third risk score into the machine-learning model or otherwise calculating the updated aggregated risk score.

Returning to FIG. 1, the aggregate risk score may be compared to one or more thresholds (e.g., defined by user input, by a machine-learning model, or the like), to determine an action. For instance, if the aggregate risk score is greater than a first threshold, a notification may be transmitted to a user device (e.g., to the wearable device, a mobile device, a computing device, or the like) associated with the user of the wearable device to present the aggregated risk score as indication of the health characteristic. The notification may be an incentive to cause the user to change behavior such as getting more exercise or changing eating habits to reduce the user's risk of a metabolic syndrome. Alternatively (or additionally), the notification may include a recommendation for the user to undergo a clinical metabolic syndrome screening (or a screening for a condition associated with metabolic syndrome such as heart disease, stroke, diabetes, combinations thereof, or the like). If the aggregated risk score greater than a second threshold, a notification may be transmitted to device associated with medical professional (e.g., a doctor).

Alternatively or additional, one or more user interfaces may be generated to display representation of the heartbeat data types, the time interval statistics, the risk scores, the aggregate risk scores, combinations thereof, and the like.

In some instances, system 100 may operate on the wearable device. In other instances, system 100 may receive sensor data from the wearable device, but execute on one or more other devices.

Figure 5:
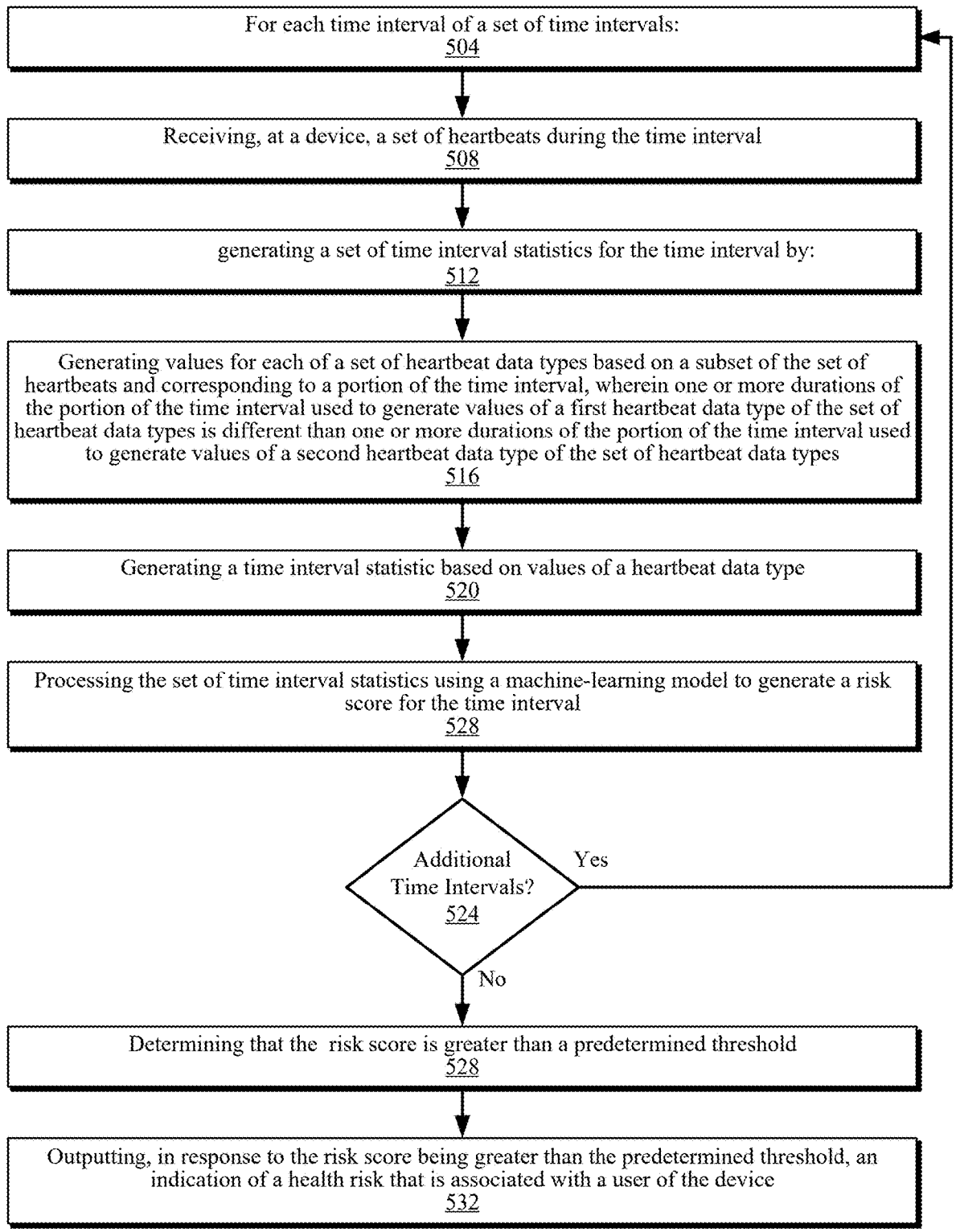
FIG. 5 depicts an example flowchart of a process for assessing metabolic syndrome risk according to aspects of the present disclosure.

FIG. 5 depicts an example flowchart of a process for assessing metabolic syndrome risk according to aspects of the present disclosure. At block 504, a device (e.g., a wearable device, a computing device, a mobile device, a server, etc.) may iterate over each time interval of a set of set of time intervals. The time intervals may correspond to a predetermined time interval over which sensor data is collected. For example, the predetermined time interval may be a week over which sensor data was collected. In some instances, the predetermined time interval may be selected based on user input (e.g., a user from which the sensor data is collected, healthcare personnel, or the like). In other instances, the predetermined time interval may be selected by the device based on a quantity of sensor data collected. For example, if sensor data is collected continuously then the device may select a predetermined time interval of a week. If sensor data is collected sporadically, then the device may select a smaller predetermined time interval to enable accurate assessment of metabolic syndrome risk using the sporadically collected data.

At block 508, the device receives a set of heartbeats during the time interval (of the current iteration). The set of heartbeats may be collected from one or more sensors such as a photoplethysmography (PPG) sensor, an electrocardiography (ECG) sensor, and/or the like. The one or more sensors may be, for example, included in the device, connected to the device via one or more wires or wireless communication protocol, connected to another device (e.g., another wearable device, a mobile device, a computing device, a server, a database, and/or the like) that is in communication with the device via one or more wires or through a wireless communication protocol, and/or the like.

At block 512, a set of time interval statistics for the time interval of the current iteration may be generated by: generating, at block 516, values for each of a set of heartbeat data types based on a subset of the set of heartbeats and corresponding to a portion of the time interval. For example, a first heartbeat data type may correspond to heartrate variability. A subset of the set of heartbeats that were collected over a day may be used to calculate one or more values for the heartrate variability heartbeat data type. For each heartbeat data type, the device may determine if the quantity of values generated (e.g., which may be based on the quantity of heartbeats in the subset of the set of heartbeats, is greater than a threshold (e.g., based on the particular heartbeat data type being analyzed). If the quantity if values is greater than the threshold for that heartbeat data type, then the values may be downs-sampled.

In some instances, one or more durations of the portion of the time interval used to generate values of a first heartbeat data type of the set of heartbeat data types is different than one or more durations of the portion of the time interval used to generate values of a second heartbeat data type of the set of heartbeat data types. For example, one heartrate variability value may be based on a subset of the set of heartbeats collected over a preceding day and one heartrate value may be based on a subset of the set of heartbeats collected over a preceding sixty seconds.

At block 520, a time interval statistic based on values of a heartbeat data type may be generated. For example, the time interval statistic may be generated using the values of the heartbeat data type that were generated. For example, the time interval statistic may be generated by downs-sampling the values, normalizing, aggregating the values into a single value, converting the values into a single value, and/or the like. The time interval statistic may be generated by, for example, discarding one or more values until one remains, calculating an average, calculating median, calculating mode, or the like.

At block 528, the time interval statistics may be processed using a trained machine-learning model to generate a risk score for the time interval. In some instances, processing the time interval statistics may include processing one more additional data types associated with the user (e.g., activity data, demographic data, and/or the like).

At block 524, the device determines if there is another time interval of the set of time intervals that has not yet been processed. If there is another time interval that has yet to be processed, then the process may continue at block 504 where the next time interval of the set of time intervals is selected. The process may then continue through blocks 508-524. If there are no more time intervals of the set of time intervals to process, the process continues to block 528.

At block 528, the device determines that the risk score is greater than a predetermined threshold. If there are multiple risks scores (e.g., one for each time interval of the set of time intervals), then the device may first aggregate each time interval of the set of time intervals to generate an aggregated risk score. The device may then determine whether the aggregated risk score is greater than the predetermined threshold instead of using the risk score.

At block 532, an indication of a health risk that is associated with the user of the device may be output in response to the risk score being greater than the predetermined threshold. For example, the health risk may correspond to a metabolic syndrome.

Although the blocks of FIG. 5 describe operations as a sequential process, operations can be performed in parallel, concurrently, or skipped. In addition, the order of the operations may be re-arranged. In some instances, the process described by FIG. 5 may terminate when the final operation (e.g., block 532) completes, but the process may include one or more additional operations (not shown). In other instances, the process described by FIG. 5 may not terminate upon completion of the final operation. Instead, upon determination of the final operation, the process may return the first operation (e.g., block 504) and the process may continue again (and again any number of time). A process may correspond to a method, a function, a procedure, a subroutine, a subprogram, etc. When a process corresponds to a function, its termination corresponds to a return of the function to the calling function or the main function.

Figure 6:
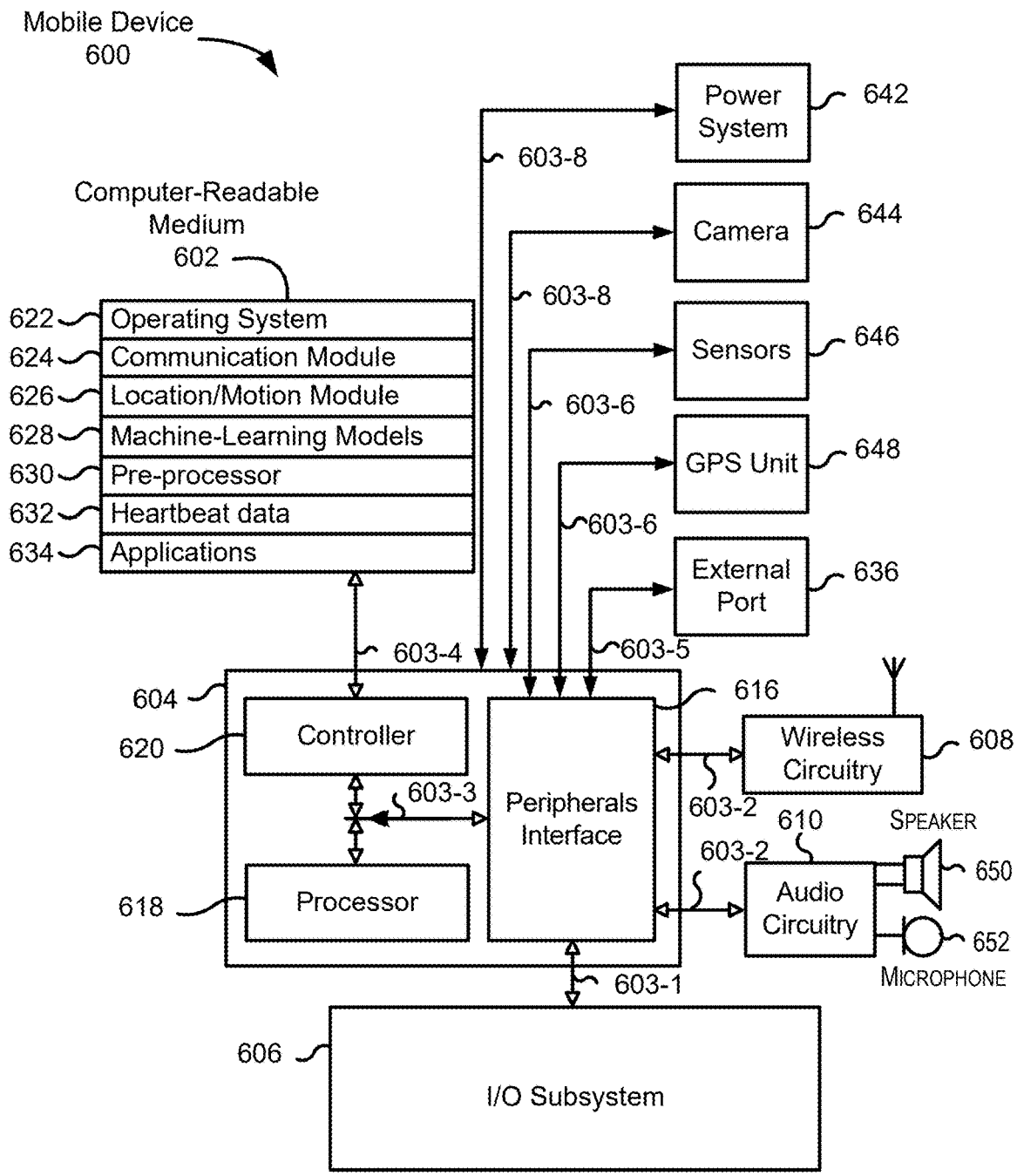
FIG. 6 illustrates a block diagram of an example device according to aspects of the present disclosure.

FIG. 6 is a block diagram of an example computing device 600, which may be a mobile device. Computing device 600 generally includes computer-readable medium 602, a processing system 604, an Input/Output (I/O) subsystem 606, wireless circuitry 608, and audio circuitry 610 including speaker 650 and microphone 652. These components may be coupled by one or more communication buses or signal lines 603. Computing device 600 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 6 is only one example of an architecture for device 600, and that device 600 can have more or fewer components than shown, or a different configuration of components. The various components shown in FIG. 6 can be implemented in hardware, software, or a combination of both hardware and software, including one or more signal processing and/or application specific integrated circuits.

Wireless circuitry 608 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 608 can use various protocols, e.g., as described herein.

Wireless circuitry 608 is coupled to processing system 604 via peripherals interface 616. Peripherals interface 616 can include conventional components for establishing and maintaining communication between peripherals and processing system 604. Voice and data information received by wireless circuitry 608 (e.g., in speech recognition or voice command applications) is sent to one or more processors 618 via peripherals interface 616. One or more processors 618 are configurable to process various data formats for one or more application programs 634 stored on medium 602.

Peripherals interface 616 couple the input and output peripherals of the device to processor 618 and computer-readable medium 602. One or more processors 618 communicate with computer-readable medium 602 via a controller 620. Computer-readable medium 602 can be any device or medium that can store code and/or data for use by one or more processors 618. Medium 602 can include a memory hierarchy, including cache, main memory and secondary memory.

Device 600 also includes a power system 642 for powering the various hardware components. Power system 642 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 600 includes a camera 644. In some embodiments, device 600 includes sensors 646. Sensors can include accelerometers, compass, gyrometer, pressure sensors, audio sensors, light sensors, barometers, heartbeat sensors (e.g., photoplethysmography, etc.), and the like.

In some embodiments, device 600 can include a GPS receiver, sometimes referred to as a GPS unit 648. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 618 run various software components stored in medium 602 to perform various functions for device 600. In some embodiments, the software components include an operating system 622, a communication module (or set of instructions) 624, a location module (or set of instructions) 626, a machine-learning models 628, pre-processor (or set of instructions) 630, an heartbeat data 632, and other applications (or set of instructions) 634, such as a car locator app and a navigation app. Machine-learning models 628 may include a set of instructions that correspond to any time of machine-learning model configured to generate prediction that characterizes a risk of a metabolic syndrome. Pre-processor 632 may include processing heartbeat data 632 by, for example, normalizing, projecting, sampling (e.g., down-sampling or up-sampling), or the like. Heartbeat data 632 may include heartbeat data collected from sensors of mobile device 600 and/or from wearable device (e.g., as described in FIG. 7).

Operating system 622 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 624 facilitates communication with other devices over one or more external ports 636 or via wireless circuitry 608 and includes various software components for handling data received from wireless circuitry 608 and/or external port 636. External port 636 (e.g., USB, FireWire, Lightning connector, 60-pin connector, etc.) is adapted for coupling directly to other devices or indirectly over a network (e.g., the Internet, wireless LAN, etc.).

Location/motion module 626 can assist in determining the current position (e.g., coordinates or other geographic location identifier) and motion of device 600. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 626 receives data from GPS unit 648 and analyzes the signals to determine the current position of the mobile device. In some embodiments, location/motion module 626 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 608 and is passed to location/motion module 626. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 600 based on the position coordinates of the corresponding transmitters. Regardless of the specific location technology used, location/motion module 626 receives information from which a location fix can be derived, interprets that information, and returns location information, such as geographic coordinates, latitude/longitude, or other location fix data.

The one or more applications 634 on the mobile device can include any applications installed on the device 600, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 606 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 606 can include a display and user input devices such as a keyboard, mouse, and/or track pad. In some embodiments, I/O subsystem 606 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 602) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 600 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

Figure 7:
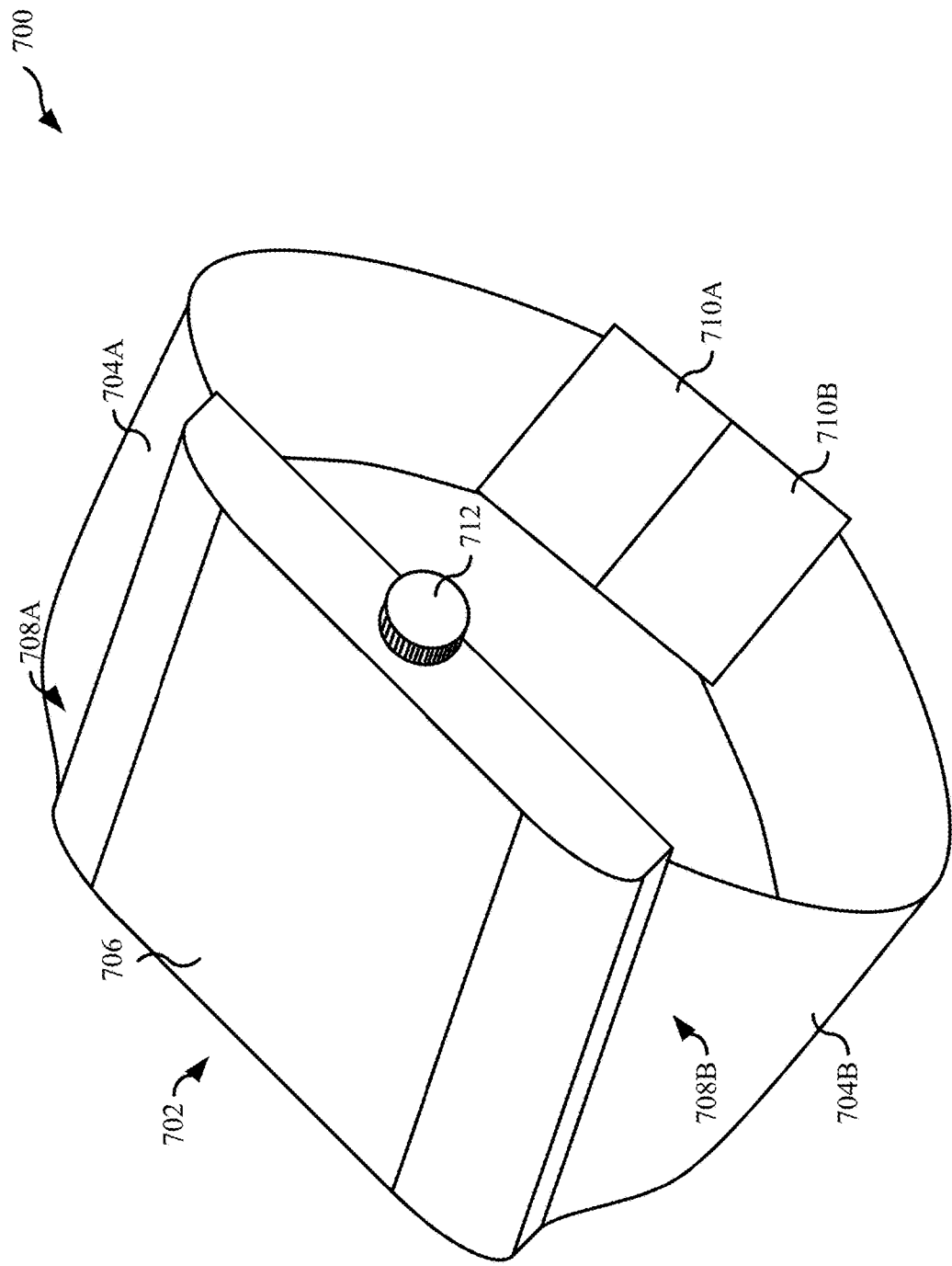
FIG. 7 depicts an example wearable watch device according to aspects of the present disclosure.

Aspects described herein may take the form of, be incorporated in, or operate with a suitable electronic device, e.g., companion devices or a watch device. One example of such a device is shown in FIG. 7 and takes the form of a wearable watch device. Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

FIG. 7 shows a wearable watch device 700 according to some embodiments of the present invention. In this example, wearable device 700 is shown as a wristwatch-like device with a face portion 702 connected to straps 704A, 704B. In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Face portion 702 can include, e.g., a touchscreen display 706 that can be appropriately sized depending on where on a user's person wearable device 700 is intended to be worn. A user can view information presented by wearable device 700 on touchscreen display 706 and provide input to wearable device 700 by touching touchscreen display 706. In some embodiments, touchscreen display 706 can occupy most or all of the front surface of face portion 702.

Straps 704A, 704B can be provided to allow wearable device 700 to be removably worn by a user, e.g., around the user's wrist, and secured thereto. In some embodiments, straps 704A, 704B can be made of any flexible material (e.g., fabrics, flexible plastics, leather, chains or flexibly interleaved plates or links made of metal or other rigid materials) and can be connected to face portion 702, e.g., by hinges. Alternatively, straps 704A, 704B can be made of a rigid material, with one or more hinges positioned at the junction of face 702 and proximal ends 708A, 708B of straps 704A, 704B and/or elsewhere along the lengths of straps 704A, 704B to allow a user to put on and take off wearable device 700. Different portions of straps 704A, 704B can be made of different materials; for instance, flexible or expandable sections can alternate with rigid sections. In some embodiments, one or both of straps 704A, 704B can include removable sections, allowing wearable device 700 to be resized to accommodate a particular user's wrist size. In some embodiments, straps 704A, 704B can be portions of a continuous strap member that runs behind or through face portion 702. Face portion 702 can be detachable from straps 704A, 704B; permanently attached to straps 704A, 704B; or integrally formed with straps 704A, 704B.

The distal ends of straps 704A, 704B opposite face portion 702 can provide complementary clasp members 710A, 710B that can be engaged with each other to secure the distal ends of straps 704A, 704B to each other, forming a closed loop. In this manner, device 700 can be secured to a user's person, e.g., around the user's wrist; clasp members 710A, 710B can be subsequently disengaged to facilitate removal of device 700 from the user's person. The design of clasp members 710A, 710B can be varied; in various embodiments, clasp members 710A, 710B can include buckles, magnetic clasps, mechanical clasps, snap closures, etc. In some embodiments, one or both of clasp members 710A, 710B can be movable along at least a portion of the length of corresponding strap 704A, 704B, allowing wearable device 700 to be resized to accommodate a particular user's wrist size.

Straps 704A, 704B can be two distinct segments, or they can be formed as a continuous band of an elastic material (including, e.g., elastic fabrics, expandable metal links, or a combination of elastic and inelastic sections), allowing wearable device 700 to be put on and taken off by stretching a band formed by straps 704A, 704B. In such embodiments, clasp members 710A, 710B can be omitted.

Straps 704A, 704B and/or clasp members 710A, 710B can include sensors that allow wearable device 700 to determine whether it is being worn at any given time. Wearable device 700 can operate differently depending on whether it is currently being worn or not. For example, wearable device 700 can inactivate various user interface and/or RF interface components when it is not being worn. In addition, in some embodiments, wearable device 700 can notify a companion device (e.g., a smartphone, a mobile device, a tablet device, a media player, a speaker, or other electronic devices) when a user puts on or takes off wearable device 700.

In various embodiments, wearable device 700 includes a rotary input such as a crown 712 (also referred to as digital crown throughout the specification). Crown 712 can be used to perform a variety of functions. In some embodiments, crown 712 provides rotation input for navigating content (e.g., zooming in and out of content, panning across content). In this example, crown 712 includes a plastic or metal crown body, preferably having conventional outer teeth. Typically, a pedestal made integral with the body of crown 715 is positioned and protrudes into face portion 702. Crown 712 may be fastened, either permanently or removably, to hardware associated with wearable device 700. Rotation of the crown (and/or a stem) may be sensed optically, electrically, magnetically, or mechanically. Further, in some embodiments the crown (and/or stem) may also move laterally, thereby providing a second type of input to the device.

Wearable device 700 may likewise include one or more buttons (not shown here). The button(s) may be depressed to provide yet another input to the device. In various embodiments, the button may be a dome switch, rocker switch, electrical contact, magnetic switch, and so on. In some embodiments the button may be waterproof or otherwise sealed against the environment.

It will be appreciated that wearable device 700 is illustrative and that variations and modifications are possible. For example, wearable device 700 can be implemented in any wearable article, including a watch, a bracelet, a necklace, a ring, a belt, a jacket, or the like. In some instances, wearable device 700 can be a clip-on device or pin-on device that has a clip or pin portion that attaches to the user's clothing. The interface portion (including, e.g., touchscreen display 706) can be attached to the clip or pin portion by a retractable cord, and a user can easily pull touchscreen display 706 into view for use without removing the clip or pin portion, then let go to return wearable device 700 to its resting location. Thus, a user can wear wearable device 700 in any convenient location.

Wearable device 700 can be implemented using electronic components disposed within face portion 702, straps 704A, 704B, and/or clasp members 710A, 710B.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve software application and the software development processes. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for software energy diagnostics to improve energy consumption of particular software applications. Accordingly, use of such personal information data enables users to improve a particular application used by a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting and processing energy consumption reports, the present technology can be configured to allow users to select to "opt in" or "opt out" of participation in the collection of personal information data during registration for services or anytime thereafter. In another example, users can select not to provide mood-associated data for energy consumption reports. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, energy consumption reports may be obtained based on non-personal information data or a bare minimum amount of personal information, such as the content being requested by the device associated with a user, other non-personal information available from other sources, or publicly available information.

Although the invention has been described with respect to specific embodiments, it will be appreciated that the invention is intended to cover all modifications and equivalents within the scope of the following claims.

What is claimed is:

1. A computer-implemented method comprising:
   receiving, at a device from a sensor, a first set of heart rate data values during a time interval corresponding to a first heartbeat data type;
   receiving, at the device from the sensor, a second set of heart rate data values during the time interval corresponding to a second heartbeat data type, wherein a first number of data values of the first set of heart rate data values is different than a second number of data values of the second set of heart rate data values;
   normalizing the first set of heart rate data values and the second set of heart rate data values to form a first set of pre-processed heart rate data values and a second set of pre-processed heart rate data values, wherein each of the first set of pre-processed heart rate data values and the second set of pre-processed heart rate data values share a same number of data values;
   generating a first value of the first heartbeat data type over a first portion of the time interval based on the first set of pre-processed heart rate data values;
   generating a second value of the second heartbeat data type over a second portion of the time interval based on the second set of pre-processed heart rate data values, wherein the first portion is different than the second portion;
   generating, using a machine-learning model, a risk score for the time interval based on the first value and the second value;
   determining that the risk score is greater than a predetermined threshold; and
   outputting, in response to the risk score being greater than the predetermined threshold, a notification to a device associated with a user, wherein the notification includes:
     an indication of a health risk that is associated with the user of the device, wherein the health risk includes a metabolic syndrome risk; and
     a recommendation corresponding to the health risk, wherein the recommendation includes at least one of a recommendation for the user to change a behavior to lower the risk of the user developing the metabolic syndrome risk or a recommendation to undergo a medical screening to screen for the metabolic syndrome risk.

2. The method of claim 1, wherein the first set of heart rate data values and the second set of heart rate data values are received from a wearable device.

3. The method of claim 1, wherein the first set of heart rate data values and the second set of heart rate data values are received from a photoplethysmography sensor.

4. The method of claim 1, further comprising:
generating a second risk score based on a third value of the first heartbeat data type and a fourth value of the second heartbeat data type; and
generating an aggregate risk score based on the risk score and second risk score, wherein outputting the indication of the health risk that is associated with the user of the device is further in response to the aggregate risk score being greater than the predetermined threshold.

5. The method of claim 1, wherein the first heartbeat data type corresponds to a heartrate variability.

6. The method of claim 1, wherein, during normalizing the first set of heart rate data values and the second set of heart rate data values, generating the first value, and the generating the second value over a time period, the method further comprises continuously, over the time period:
receiving a plurality of sets of heart rate data values corresponding to a plurality of heartbeat data types over a different time interval than the time interval;
normalizing at least two sets of heart rate data values of the plurality of sets of heart rate data values to form a pre-processed set of heart rate data values; and
generating a value of each heartbeat data type over different portions of the different time interval based on the pre-processed set of heart rate data values.

7. The computer-implemented method of claim 1, wherein:
the predetermined threshold is a first threshold, the notification is a first notification, and the device is a second device; and
in response to the risk score being greater than the first threshold, outputting the notification includes outputting the first notification to the first device associated with the user; and
the computer-implemented method further compromises:
determining that the risk score is greater than a second threshold; and
in response to the risk score being greater than the second threshold, outputting a second notification to a second device associated with a second user.

8. The computer-implemented method of claim 7, wherein the second user is a medical professional.

9. The computer-implemented method of claim 1, wherein:
generating the risk score includes generating the risk score to indicate that a user of the device includes a health risk of at least one of heart disease, stroke, or diabetes; and
the recommendation includes:
a first recommendation for the user to at least one of get more exercise or change eating habits; or
a second recommendation for the user to undergo a medical screening to screen for the at least one of heart disease, stroke, or diabetes.

10. The computer-implemented method of claim 9, wherein the recommendation includes:
the first recommendation for the user to at least one of get more exercise or change eating habits; and
the second recommendation for the user to undergo a medical screening to screen for the at least one of heart disease, stroke, or diabetes.

11. A system comprising:
a memory comprising computer-executable instructions; and
one or more processors in communication with the memory and configured to execute the computer-executable instructions to perform operations including:
receiving, at a device from a sensor, a first set of heart rate data values during a time interval corresponding to a first heartbeat data type;
receiving, at the device from the sensor, a second set of heart rate data values during the time interval corresponding to a second heartbeat data type, wherein a first number of data values of the first set of heart rate data values is different than a second number of data values of the second set of heart rate data values;
normalizing the first set of heart rate data values and the second set of heart rate data values to form a first set of pre-processed heart rate data values and a second set of pre-processed heart rate data values, wherein each of the first set of pre-processed heart rate data values and the second set of pre-processed heart rate data values share a same number of data values;
generating a first value of the first heartbeat data type over a first portion of the time interval based on the first set of pre-processed heart rate data values;
generating a second value of the second heartbeat data type over a second portion of the time interval based on the second set of pre-processed heart rate data values, wherein the first portion is different than the second portion;
generating, using a machine-learning model, a risk score for the time interval based on the first value and the second value;
determining that the risk score is greater than a predetermined threshold; and
outputting, in response to the risk score being greater than the predetermined threshold, a notification to a device associated with a user, wherein the notification includes:
an indication of a health risk that is associated with the user of the device, wherein the health risk includes a metabolic syndrome risk; and
a recommendation corresponding to the health risk, wherein the recommendation includes at least one of a recommendation for the user to change a behavior to lower the risk of the user developing the metabolic syndrome risk or a recommendation to undergo a medical screening to screen for the metabolic syndrome risk.

12. The system of claim 11, wherein the first set of heart rate data values and the second set of heart rate data values are received from a wearable device.

13. The system of claim 11, wherein the first set of heart rate data values and the second set of heart rate data values are received from a photoplethysmography sensor.

14. The system of claim 11, further comprising:
generating a second risk score based on a third value of the first heartbeat data type and a fourth value of the second heartbeat data type; and
generating an aggregate risk score based on the risk score and second risk score, wherein outputting the indication of the health risk that is associated with the user of the device is further in response to the aggregate risk score being greater than the predetermined threshold.

15. The system of claim 11, wherein the first heartbeat data type corresponds to a heartrate variability.

16. The system of claim 11, wherein:
generating the risk score includes generating the risk score to indicate that a user of the device includes a health risk of at least one of heart disease, stroke, or diabetes; and
the recommendation includes:
a first recommendation for the user to at least one of get more exercise or change eating habits; or
a second recommendation for the user to undergo a medical screening to screen for the at least one of heart disease, stroke, or diabetes.

17. A non-transitory computer-readable storage medium comprising computer-executable instructions that, when executed by one or more processors, cause the one or more processors to perform operations including:
receiving, at a device from a sensor, a first set of heart rate data values during a time interval corresponding to a first heartbeat data type;
receiving, at a device from a sensor, a first set of heart rate data values during a time interval corresponding to a first heartbeat data type;
receiving, at the device from the sensor, a second set of heart rate data values during the time interval corresponding to a second heartbeat data type, wherein a first number of data values of the first set of heart rate data values is different than a second number of data values of the second set of heart rate data values;
normalizing the first set of heart rate data values and the second set of heart rate data values to form a first set of pre-processed heart rate data values and a second set of pre-processed heart rate data values, wherein each of the first set of pre-processed heart rate data values and the second set of pre-processed heart rate data values share a same number of data values;
generating a first value of the first heartbeat data type over a first portion of the time interval based on the first set of pre-processed heart rate data values;
generating a second value of the second heartbeat data type over a second portion of the time interval based on the second set of pre-processed heart rate data values, wherein the first portion is different than the second portion;
generating, using a machine-learning model, a risk score for the time interval based on the first value and the second value;
determining that the risk score is greater than a predetermined threshold; and
outputting, in response to the risk score being greater than the predetermined threshold, a notification to a device associated with a user, wherein the notification includes:
an indication of a health risk that is associated with the user of the device, wherein the health risk includes a metabolic syndrome risk; and
a recommendation corresponding to the health risk, wherein the recommendation includes at least one of a recommendation for the user to change a behavior to lower the risk of the user developing the metabolic syndrome risk or a recommendation to undergo a medical screening to screen for the metabolic syndrome risk.

18. The non-transitory computer-readable storage medium of claim 17, wherein the first set of heart rate data values and the second set of heart rate data values are received from a photoplethysmography sensor.

19. The non-transitory computer-readable storage medium of claim 17, further comprising:
generating a second risk score based on a third value of the first heartbeat data type and a fourth value of the second heartbeat data type; and
generating an aggregate risk score based on the risk score and second risk score, wherein outputting the indication of the health risk that is associated with the user of the device is further in response to the aggregate risk score being greater than the predetermined threshold.

20. The non-transitory computer-readable storage medium of claim 17, wherein the first heartbeat data type corresponds to a heartrate variability.

* * * * *